March 24, 1970  J. S. WHITE  3,501,877
MASONRY JOINT SPACER
Filed March 28, 1968
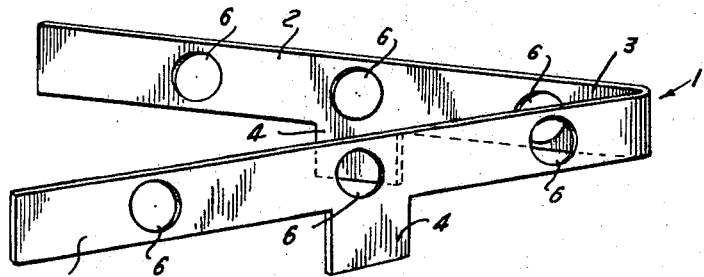
Fig. I
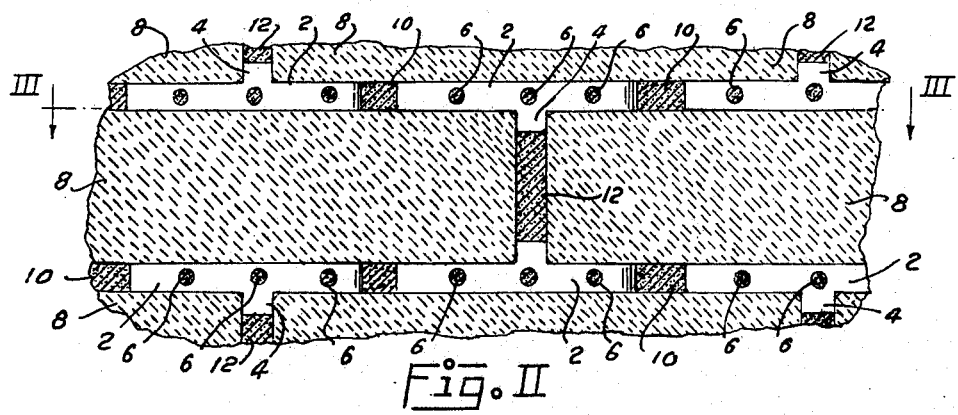
Fig. II
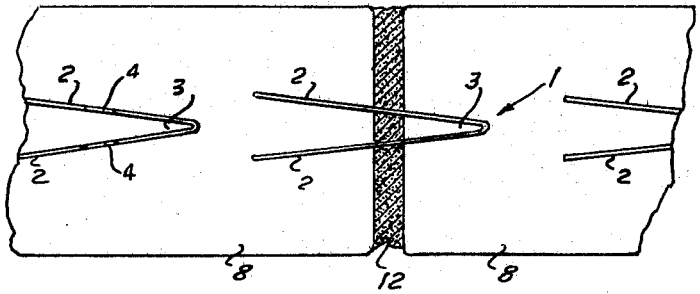
Fig. III
INVENTOR
John S. White
BY Howard E. Moore
ATTORNEY

United States Patent Office 3,501,877
Patented Mar. 24, 1970

3,501,877
MASONRY JOINT SPACER
John S. White, Rte. 4, Box 983W,
Lufkin, Tex. 75901
Filed Mar. 28, 1968, Ser. No. 716,838
Int. Cl. E04b 1/41, 2/06; E04c 5/18
U.S. Cl. 52—127                                3 Claims

ABSTRACT OF THE DISCLOSURE

A masonry joint spacer including diverging legs the width of which define the width of a horizontal mortar joint and a shoulder on the legs for gauging the width of a vertical joint wherein the spacer is concealed in the mortar joint, providing automatic spacing and structural reinforcement.

BACKGROUND OF THE INVENTION

Heretofore masonry construction has required highly skilled craftsmen of the masonry trade primarily because of the inability of laymen to form straight, evenly spaced joints. Joint spacing is critical from both the structural standpoint and for appearance.

Highly skilled craftsmen often encounter difficulty in attaining satisfactory joints when adverse conditions are encountered such as unstable footing or foundations upon which a wall is to be erected.

Likewise the skilled craftsman encounters difficulty when a relatively high masonry wall is being constructed because each layer of masonry material is supported by the layer directly beneath it and consequently the mortar must be allowed to dry before laying successive layers above or it will be squeezed from the joint.

Masonry walls often crack when foundations settle. Since the mortar joint is the weakest portion of masonry construction, cracks generally run diagonally across a portion of the wall following mortar joints.

SUMMARY OF THE INVENTION

I have developed a masonry joint spacer which eliminates many of the problems heretofore encountered in masonry construction because the joints are spaced and reinforced by a single space member which supports the weight of the masonry blocks while the mortar sets.

It is therefore a primary object of the present invention to provide a masonry joint spacer which will enable persons not skilled in masonry work to perform a task which heretofore required great skill.

Another object of the present invention is to provide a masonry joint spacer which simultaneously spaces horizontal and vertical joints.

A further object of the present invention is to provide a masonry joint spacer which will support the load of successive layers of masonry material thereby eliminating the possibility of squeezing wet mortar from joints.

A further object of the present invention is to provide a masonry joint spacer which will reinforce the joint to prevent cracking along the joint.

A still further object of the present invention is to provide a masonry joint spacer which does not occupy appreciable space in the joint.

Another object of the present invention is to provide a masonry joint spacer which does not prevent the bonding of mortar therearound and therethrough.

Still another object of the present invetnion is to provide a masonry joint spacer which aids in attaining a straight vertical wall because brick, cinder blocks and the like will be supported transversely as well as longitudinally.

A further object of the present invention is to provide a masonry joint spacer which is non-corrosive, thereby eliminating the possibility of decomposition of the spacer and weakening of the joint with age.

Another object of the present invention is to provide a masonry joint spacer which is inexpensive and easy to manufacture, making use of the same economically feasible for laymen and craftsmen.

Other and further objects of the invention will become apparent upon reading the detailed specification hereinafter following and by referring to the drawings annexed hereto.

DESCRIPTION OF THE DRAWING

The accompanying drawing of a preferred embodiment of the invention is provided so that the invention may be better and more fully understood, in which:

FIGURE I is a perspective view of the masonry joint spacer;

FIGURE II is an elevational view of a masonry wall showing the relationship of joint spacers thereto; and FIGURE III is a sectional view taken along lines III—III of FIGURE II.

Numeral references are employed to indicate the various parts as shown in the drawing and like numerals indicate like parts throughout the various figures of the drawing.

DESCRIPTION OF A PREFERRED EMBODIMENT

Referring to FIGURE I of the drawing the numeral 1 generally designates a preferred embodiment of a masonry joint spacer consisting of a continuous V-shaped body member having diverging legs 2. Shoulder 4 on legs 2 extend outwardly from a central portion of each leg 2. Legs 2 and shoulders 4 provide horizontal and vertical joint spacers respectively between bricks or other masonry. Holes 6 are provided in the legs 2 to allow mortar to flow therethrough, forming a bond through and around the spacer.

As shown in FIGURES II and III, the legs 2 of joint spacer 1 support masonry material, such as a brick 8, thereby gauging and defining the width of the horizontal joint. The outwardly extending shoulders 4 gauge and define the width of the vertical joint 12. Measuring along the length of leg 2, it will be noted that the width of shoulder 4 is greater than the width of leg 2. The width of shoulder 4 is proportional to the angle 3 between legs 2 because the shoulder extends diagonally between the bricks 8 and must therefore be wider than the desired perpendicular distance across the joint 12.

Referring to FIGURES II and III of the drawing, it should be noted that the diverging legs 2 of the spacer 1 support brick 8 horizontally and vertically to assure not only evenly spaced joints but also to prevent leaning of the wall to maintain alignment of the wall in the vertical plane.

When mortar is placed in the joints, the spacer 2 is completely concealed and bound in the mortar of the joint, thereby forming structural reinforcement for the joints as well as automatically spacing the joints without detracting from the appearance of the structure.

When the joint spacer is to be used adjacent corners the shoulder 4 may be folded over or removed to facilitate spacing the horizontal mortar joint.

The spacer 1 may be constructed of any suitable material. However, I contemplate stamping and folding the spacer from non-corrosive sheet metal. The spacer may be galvanized, tin-plated or coated with plastic material or made entirely of plastic to enhance its resistance to corrosion, if it is deemed expedient to do so.

In using the spacer same may be placed on the brick (FIGURE III) with the legs 4 extending between ends of adjoining bricks. Thus the uniform horizontal and vertical spacing of successive layers of brick, as well as the reinforcement of the mortar, is provided for in the completed structure.

From the foregoing it should be apparent that I have developed a new and novel masonry joint spacer which spaces vertical and horizontal joints enabling an unskilled workman to perform a superior masonry construction. It should also be apparent that the joint spacer will be invaluable to skilled craftsmen not only because of the spacing capability but also due to its load bearing ability and reinforcement for masonry joints.

Having described my invention, I claim:

1. A joint spacer comprising a V-shaped body; a plurality of spaced legs on the body for defining the width of a first joint; apertures through the legs in which mortar may be disposed to form a bond around and through the legs; and a spacer member extending outwardly from a central portion of each leg for defining the width of a second joint intersecting the first joint.

2. The combination called for in claim 1 wherein the spacer member is coated with a corrosion resistant plastic.

3. The combination called for in claim 1 with each spacer member having a predetermined width greater than the width of the spaced legs which is proportional to the angle between the legs.

References Cited

UNITED STATES PATENTS

| | | | |
|---|---|---|---|
| 641,067 | 1/1900 | Blazo | 52—438 |
| 1,165,475 | 12/1915 | Werkenthin | 52—442 |
| 1,943,485 | 1/1934 | Osborne | 52—712 |
| 1,955,587 | 4/1934 | Kerner | 52—442 |
| 2,669,116 | 2/1954 | Erickson | 52—604 |
| 2,732,705 | 1/1956 | Ray | 52—442 |
| 2,949,763 | 8/1960 | Felder | 52—604 |
| 2,930,135 | 3/1960 | Rodtz | 52—604 |
| 3,420,031 | 1/1969 | Castelli | 52—442 |

FOREIGN PATENTS 36,708    1910    Sweden.

HENRY C. SUTHERLAND, Primary Examiner

U.S. Cl. X.R.

52—442, 604